United States Patent
Onsager et al.

(10) Patent No.: US 8,718,845 B2
(45) Date of Patent: May 6, 2014

(54) ENERGY MANAGEMENT SYSTEM FOR HEAVY EQUIPMENT

(75) Inventors: Michael Gordon Onsager, Franklin, WI (US); Joseph Helfrich, Milwaukee, WI (US); Dave L. Perugini, Kenosha, WI (US); Wayne George Chmiel, Norway, WI (US); Peter James Miller, Brookfield, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 689 days.

(21) Appl. No.: 12/899,450

(22) Filed: Oct. 6, 2010

(65) Prior Publication Data

US 2012/0089280 A1    Apr. 12, 2012

(51) Int. Cl.
*B60L 11/00* (2006.01)
(52) U.S. Cl.
USPC ...... 701/22; 60/431; 180/65.245; 180/65.275
(58) Field of Classification Search
USPC ............... 60/413, 414, 416, 431; 180/65.265, 180/65.275, 65.29, 65.245; 307/9.1, 10.1; 701/22
See application file for complete search history.

(56) References Cited

U.S. PATENT DOCUMENTS

| | | |
|---|---|---|
| 3,425,574 A | 2/1969 | Wilgrubs et al. |
| 3,891,354 A | 6/1975 | Bosch |
| 4,050,478 A | 9/1977 | Virtue et al. |
| 4,230,022 A | 10/1980 | Bianchetta et al. |
| 4,533,900 A | 8/1985 | Muhlberger et al. |
| 4,606,313 A | 8/1986 | Izumi et al. |
| 4,763,473 A | 8/1988 | Ziplies et al. |
| 4,875,337 A | 10/1989 | Sugiyama et al. |
| 5,167,121 A | 12/1992 | Sepehri et al. |
| 5,295,353 A | 3/1994 | Ikari |
| 5,303,551 A | 4/1994 | Lee |
| 5,563,351 A | 10/1996 | Miller |
| 5,673,558 A | 10/1997 | Sugiyama et al. |
| 5,722,190 A | 3/1998 | Arnold |

(Continued)

FOREIGN PATENT DOCUMENTS

| | | |
|---|---|---|
| DE | 22 51 904 | 4/1974 |
| DE | 23 31 617 | 1/1975 |

(Continued)

OTHER PUBLICATIONS

International Search Report and Written Opinion for International Application No. PCT/US2011/052966, mail date Apr. 10, 2012, 9 pages.

(Continued)

*Primary Examiner* — Stephen Holwerda
(74) *Attorney, Agent, or Firm* — Foley & Lardner LLP (57) ABSTRACT

Heavy equipment includes a body, an electrical bus, and working components coupled to the body and powered by electricity conveyed via the electrical bus. The heavy equipment further includes a generator set providing an electrical output to the electrical bus, an energy storage element configured to be coupled to the electrical bus, and a computerized controller coupled to the energy storage element. The computerized controller includes a logic module for coupling the energy storage element to the electrical bus in advance of a predicted increase in demand upon the electrical bus, where the increase in demand is anticipated by the computerized controller as forthcoming based upon extrapolation, at least in part, from data related to a previous operation of the heavy equipment.

11 Claims, 8 Drawing Sheets

(56) References Cited

U.S. PATENT DOCUMENTS

| | | |
|---|---|---|
| 5,852,934 A | 12/1998 | Chung et al. |
| 5,890,303 A | 4/1999 | Ishikawa et al. |
| 6,005,360 A | 12/1999 | Pace |
| 6,087,945 A | 7/2000 | Yasuda |
| 6,141,629 A | 10/2000 | Yamamoto et al. |
| 6,148,548 A | 11/2000 | Tohji |
| 6,164,069 A | 12/2000 | Takahashi et al. |
| 6,164,388 A | 12/2000 | Martunovich et al. |
| 6,175,217 B1 | 1/2001 | Da Ponte et al. |
| 6,199,307 B1* | 3/2001 | Kagoshima et al. ............ 37/443 |
| 6,282,891 B1 | 9/2001 | Rockwood |
| 6,323,608 B1 | 11/2001 | Ozawa |
| 6,326,763 B1 | 12/2001 | King et al. |
| 6,339,737 B1 | 1/2002 | Yoshimura et al. |
| 6,422,001 B1 | 7/2002 | Sherman et al. |
| 6,460,332 B1 | 10/2002 | Maruta et al. |
| 6,584,769 B1 | 7/2003 | Bruun |
| 6,591,697 B2 | 7/2003 | Henyan |
| 6,591,758 B2 | 7/2003 | Kumar |
| 6,612,246 B2 | 9/2003 | Kumar |
| 6,635,973 B1* | 10/2003 | Kagoshima et al. ......... 307/10.1 |
| 6,650,091 B1 | 11/2003 | Shiue et al. |
| 6,678,972 B2 | 1/2004 | Naruse et al. |
| 6,683,389 B2 | 1/2004 | Geis |
| 6,708,787 B2 | 3/2004 | Naruse et al. |
| 6,725,581 B2 | 4/2004 | Naruse et al. |
| 6,789,335 B1 | 9/2004 | Kinugawa et al. |
| 6,799,424 B2 | 10/2004 | Ioku et al. |
| 6,810,362 B2 | 10/2004 | Adachi et al. |
| 6,820,356 B2 | 11/2004 | Naruse et al. |
| 6,832,175 B2 | 12/2004 | Adachi et al. |
| 6,864,663 B2 | 3/2005 | Komiyama et al. |
| 6,870,139 B2 | 3/2005 | Petrenko |
| 6,876,098 B1 | 4/2005 | Gray, Jr. |
| 6,907,384 B2 | 6/2005 | Adachi et al. |
| 6,922,990 B2 | 8/2005 | Naruse et al. |
| 6,962,050 B2 | 11/2005 | Hiraki et al. |
| 7,069,674 B2 | 7/2006 | Arii |
| 7,078,825 B2 | 7/2006 | Ebrahim et al. |
| 7,078,877 B2 | 7/2006 | Salasoo et al. |
| 7,082,758 B2 | 8/2006 | Kageyama et al. |
| 7,096,985 B2 | 8/2006 | Charaudeau et al. |
| 7,146,808 B2 | 12/2006 | Devier et al. |
| 7,174,826 B2 | 2/2007 | Kerrigan et al. |
| 7,190,133 B2 | 3/2007 | King et al. |
| 7,251,934 B2 | 8/2007 | Lech et al. |
| 7,252,165 B1 | 8/2007 | Gruenwald et al. |
| 7,258,183 B2 | 8/2007 | Leonardi et al. |
| 7,275,369 B2 | 10/2007 | Kim |
| 7,298,102 B2 | 11/2007 | Sopko et al. |
| 7,356,991 B2 | 4/2008 | Kim et al. |
| 7,378,808 B2 | 5/2008 | Kuras et al. |
| 7,386,978 B2 | 6/2008 | Ivantysynova et al. |
| 7,398,012 B2 | 7/2008 | Koellner |
| 7,401,464 B2 | 7/2008 | Yoshino |
| 7,430,967 B2 | 10/2008 | Kumar |
| 7,439,631 B2 | 10/2008 | Endou |
| 7,444,809 B2 | 11/2008 | Smith et al. |
| 7,444,944 B2 | 11/2008 | Kumar et al. |
| 7,448,328 B2 | 11/2008 | Kumar |
| 7,456,509 B2 | 11/2008 | Gray, Jr. |
| 7,479,757 B2 | 1/2009 | Ahmad |
| 7,518,254 B2 | 4/2009 | Donnelly et al. |
| 7,531,916 B2 | 5/2009 | Franklin et al. |
| 7,532,960 B2 | 5/2009 | Kumar |
| 7,533,527 B2 | 5/2009 | Naruse |
| 7,560,904 B2 | 7/2009 | Alvarez-Troncoso |
| 7,571,683 B2 | 8/2009 | Kumar |
| 7,628,236 B1 | 12/2009 | Brown |
| 7,730,981 B2 | 6/2010 | McCabe et al. |
| 7,748,279 B2 | 7/2010 | Budde et al. |
| 8,022,663 B2 | 9/2011 | Davis et al. |
| 2002/0104239 A1 | 8/2002 | Naruse et al. |
| 2003/0089557 A1 | 5/2003 | Eilinger |
| 2004/0021441 A1* | 2/2004 | Komiyama et al. ........... 320/104 |
| 2004/0073468 A1 | 4/2004 | Vyas et al. |
| 2005/0061561 A1* | 3/2005 | Leonardi et al. ............. 180/65.1 |
| 2005/0139399 A1 | 6/2005 | Gopal |
| 2005/0246082 A1 | 11/2005 | Miki et al. |
| 2005/0263331 A1* | 12/2005 | Sopko et al. ................. 180/65.1 |
| 2006/0061922 A1 | 3/2006 | Mihai et al. |
| 2007/0080236 A1* | 4/2007 | Betz et al. .................... 237/12.1 |
| 2007/0166168 A1 | 7/2007 | Vigholm et al. |
| 2007/0234718 A1 | 10/2007 | Vigholm |
| 2008/0290842 A1 | 11/2008 | Davis et al. |
| 2008/0295504 A1 | 12/2008 | Vigholm et al. |
| 2009/0056324 A1 | 3/2009 | Itakura et al. |
| 2009/0090102 A1 | 4/2009 | Busse et al. |
| 2009/0159143 A1 | 6/2009 | Nishikawa et al. |
| 2010/0097029 A1 | 4/2010 | McCabe |
| 2010/0289443 A1 | 11/2010 | Mazumdar et al. |

FOREIGN PATENT DOCUMENTS

| | | |
|---|---|---|
| DE | 36 11 553 | 7/1987 |
| DE | 41 02 621 | 8/1992 |
| DE | 699 20 452 | 11/2005 |
| DE | 1020050 17 127 | 11/2006 |
| JP | 2000-170687 | 6/2000 |
| JP | 2003-013866 | 1/2003 |
| JP | 2004-100847 | 4/2004 |
| JP | 2008-057687 | 3/2008 |
| JP | 2009-167618 | 7/2009 |
| KR | 10199641737 | 12/1996 |
| KR | 10300305 | 6/2001 |
| WO | WO 90/10850 | 9/1990 |
| WO | WO 2004/074686 | 9/2004 |
| WO | WO 2010/058768 | 5/2010 |

OTHER PUBLICATIONS

International Search Report and Written Opinion for PCT Application No. PCT/EP2007/003582, mail date Jan. 30, 2008, 23 pages.
International Search Report and Written Opinion for PCT Application No. PCT/US2010/048257, mail date May 27, 2011, 7 pages.
International Search Report and Written Opinion for PCT Application No. PCT/US2011/057491, mail date May 18, 2012, 9 pages.

* cited by examiner

ENERGY MANAGEMENT SYSTEM FOR HEAVY EQUIPMENT

BACKGROUND

The present disclosure relates generally to the field of energy management and storage systems. More specifically the present disclosure relates to energy storage systems for operation with heavy equipment for mining, excavating, and construction.

Heavy equipment, such as power shovels and excavators, may include a deck or other platform that rotates above tracks, wheels, pontoons, etc. Extending from the deck, the heavy equipment may further include a boom for an articulated arm or crane designed to operate a bucket, a breaker, a hook, or another form of work implement. Accordingly, such heavy equipment typically includes one or more actuators designed to move the tracks, rotate the deck, and operate the articulated arm and work implement.

Some types of heavy equipment are designed to operate in substantially-repetitive work cycles. By way of example, a power shovel or excavator may typically operate in work cycles that include digging, swinging, dumping, and returning steps for operating a bucket to dig and load fragmented rock, earth, minerals, overburden, and the like for mining purposes. These steps are essentially repeated time and time again, with minor variations to adjust the height at which the bucket engages the ground. The heavy equipment may use hydraulic cylinders or other forms of actuators to perform the lifting, rotating, and lowering movements.

SUMMARY

One embodiment relates to heavy equipment, which includes a body, an electrical bus, and working components coupled to the body and powered by electricity conveyed via the electrical bus. The heavy equipment further includes a generator set providing an electrical output to the electrical bus, an energy storage element configured to be coupled to the electrical bus, and a computerized controller coupled to the energy storage element. The computerized controller includes a logic module for coupling the energy storage element to the electrical bus in advance of a predicted increase in demand upon the electrical bus, where the increase in demand is anticipated by the computerized controller as forthcoming based upon extrapolation, at least in part, from data related to a previous operation of the heavy equipment.

Another embodiment relates to heavy equipment designed to operate in a substantially repetitive cycle. The heavy equipment includes a work implement, a pump, and a linear actuator for operating the work implement and at least partially powered by fluid pressurized by the pump. The heavy equipment further includes a generator set, an electrical bus, a supplemental power source, and a computerized controller. The generator set provides electrical energy as an output for powering the pump, and the electrical bus couples the generator set and the pump. The supplemental power source is configured to be electrically connected to the electrical bus, and the computerized controller controls the connection of the supplemental power source to the electrical bus. The computerized controller includes a logic module for connecting the supplemental power source to the electrical bus in advance of a predicted heightened loading, during the substantially repetitive cycle, requiring an increased supply of pressurized fluid from the pump. The predicted heightened loading is anticipated by the computerized controller as forthcoming based upon extrapolation, at least in part, from data associated with a previous iteration of the substantially repetitive cycle.

Yet another embodiment relates to heavy equipment designed to operate in a substantially repetitive cycle. The heavy equipment includes a work implement and an actuator for operating the work implement. The heavy equipment further includes an electrical bus, a power source connected to the electrical bus for powering the actuator, a capacitor, and a computerized controller. The capacitor is configured to be connected to the electrical bus for receiving power from the power source during a portion of the substantially repetitive cycle and for augmenting the power source during another portion of the substantially repetitive cycle. The computerized controller includes a logic module for connecting the capacitor to the electrical bus in advance of a predicted demand on the electrical bus, where the predicted demand is anticipated by the computerized controller as forthcoming based upon extrapolation, at least in part, from data related to a past operation of the heavy equipment.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
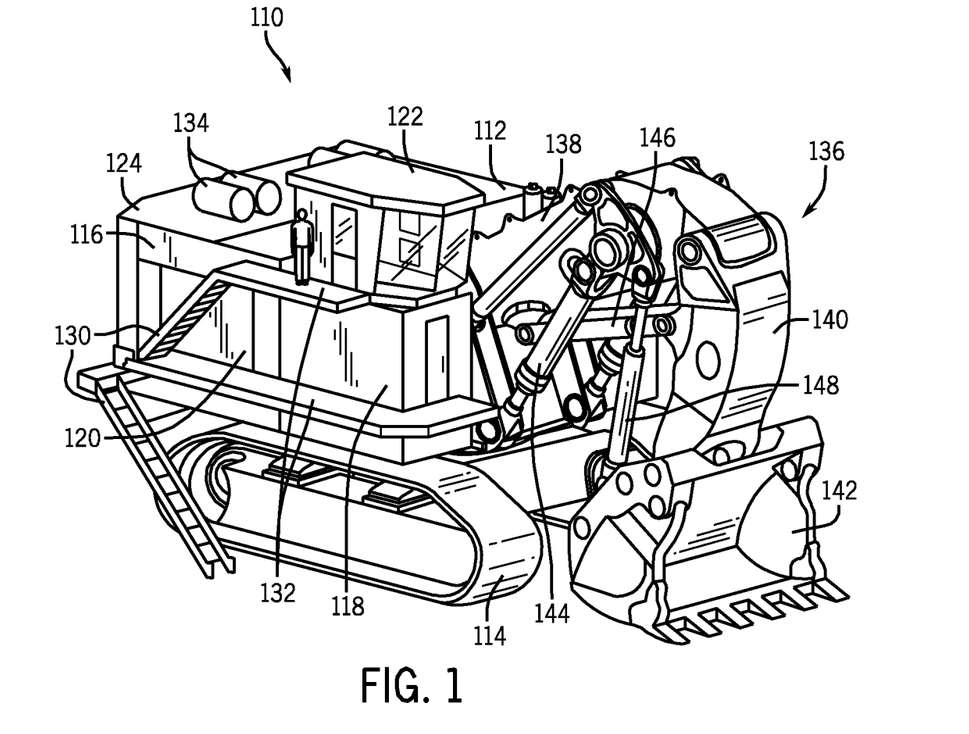
FIG. 1 is a perspective view of a power shovel according to an exemplary embodiment.

Referring to FIG. 1, heavy equipment in the form of a power shovel 110 includes a deck 112 moveable upon tracks 114. The deck 112 further includes a powerhouse 116, an electronic compartment 118 (e.g., e-house), a hydraulic system 120, an operator cab 122, energy storage components 124, and engine and hydraulic cooling systems 126, 128 (see FIG. 2). Various stairwells 130 and walkways 132 may be incorporated with the deck 112 for movement throughout the power shovel 110. Exhaust mufflers 134 are positioned on the deck 112 above the powerhouse 116 and to the rear of the operator cab 122. Extending from the deck 112, the power shovel 110 further includes an articulated arm 136 including a boom 138 rotatably coupled to an arm 140 (e.g., stick), which is rotatably coupled to a bucket 142.

According to an exemplary embodiment, actuators (e.g., linear actuators) in the form of hydraulic cylinders, including a boom cylinder 144, an arm cylinder 146, and a curl cylinder 148, extend between the deck 112 and boom 138 to control movement of the boom 138 relative to the deck 112, between the boom 138 and the arm 140 to control movement of the arm 140 relative to the boom 138, and between the boom 138 and the bucket 142 to control movement of the bucket 142 relative to the arm 140 and/or boom 138. According to an exemplary embodiment, the hydraulic cylinders 144, 146, 148 are double-acting cylinders, configured to receive hydraulic fluid on both ends of the respective piston. Additional actuators (e.g., electric or hydraulic motors) may be used to propel the power shovel 110 via the tracks 114, and/or to rotate the deck 112 relative to the tracks 114.

Figure 2:
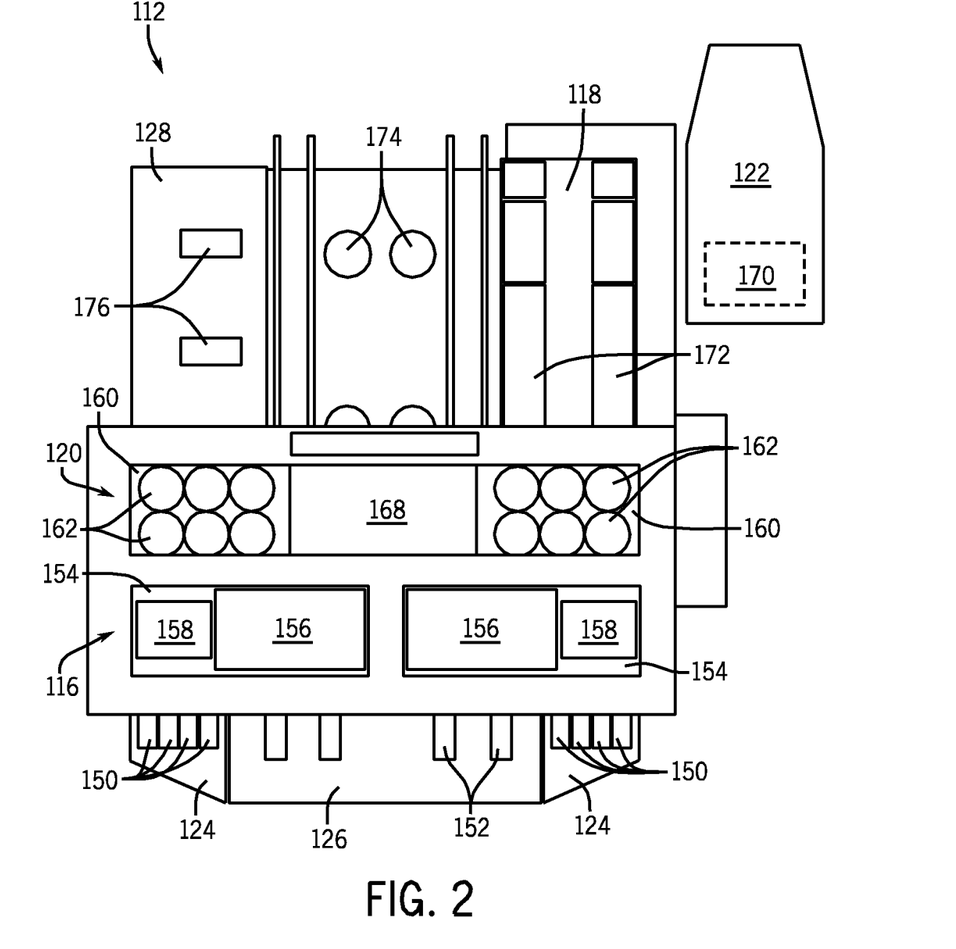
FIG. 2 is a plan diagram of the power shovel of FIG. 1.
Figure 3:
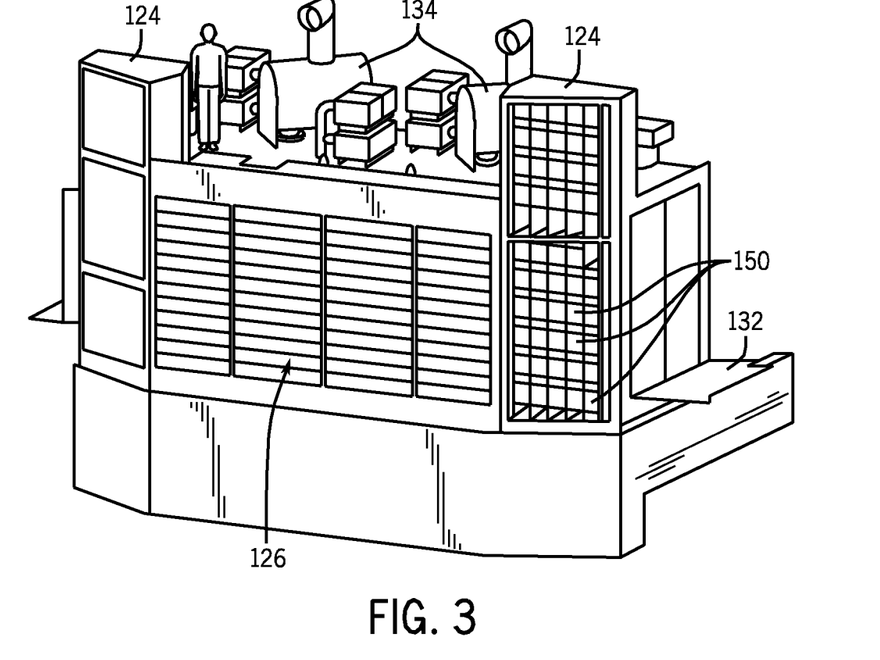
FIG. 3 is a perspective view of a portion of the deck of the power shovel of FIG. 1.

Referring to FIGS. 2-3, by way of example, the deck 112 includes a supplemental power source in the form of energy storage components 124 located proximate to the rear corners of the deck 112. In some embodiments the energy storage components 124 include banks of one or more ultra-capacitors 150. In other contemplated embodiments, other forms of energy storage components (e.g., secondary batteries) or other arrangements of energy storage components are used. Also in the rear of the deck 112, an engine cooler system 126, which may include one or more coolant fans 152 and/or blowers, is positioned between the energy storage components 124.

Figure 4:
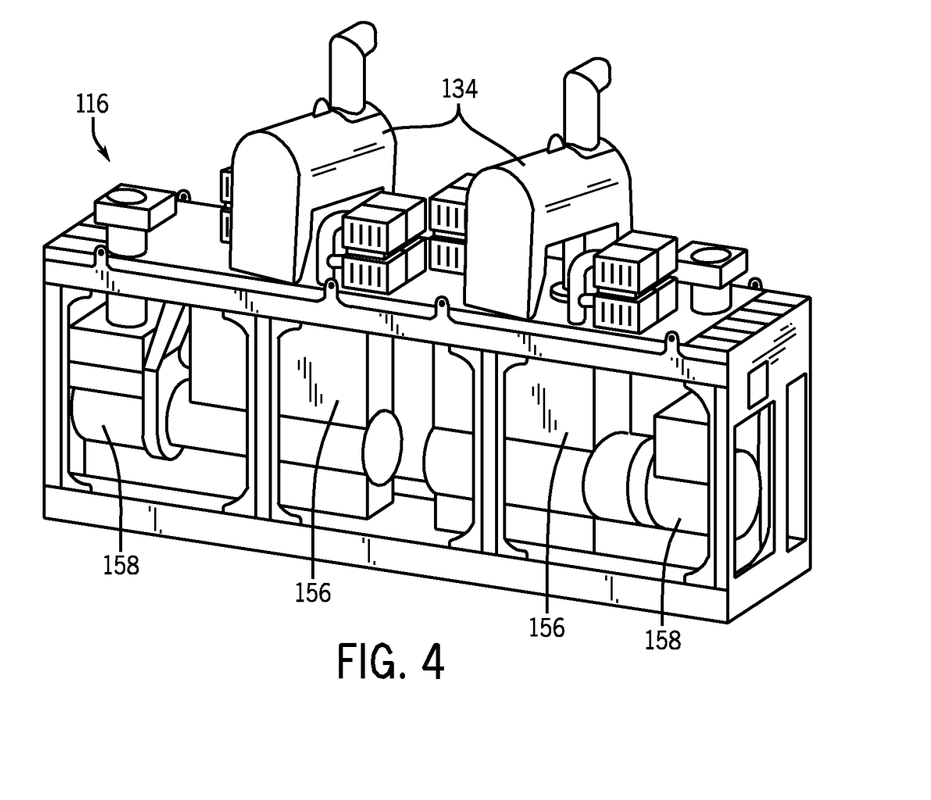
FIG. 4 is a perspective view of generators associated with the power shovel of FIG. 1.
Figure 7:
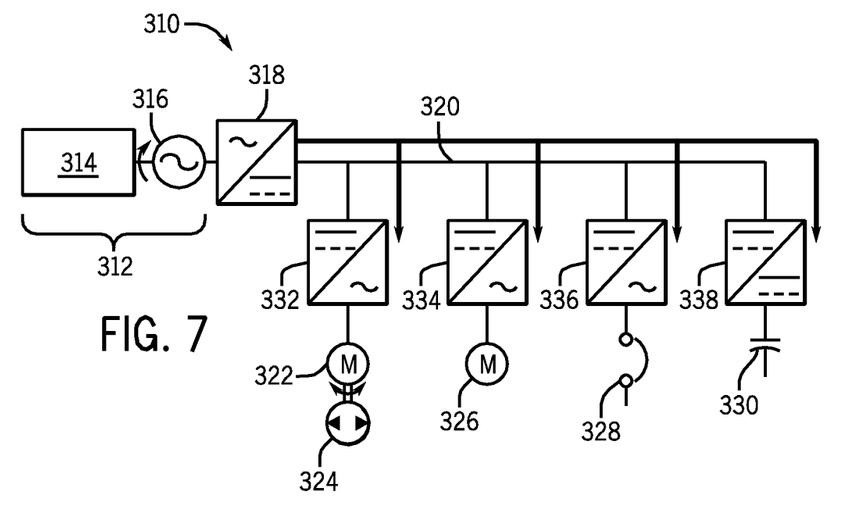
FIG. 7 is a schematic diagram of an energy management system in a first configuration according to an exemplary embodiment.

Referring to now FIGS. 2 and 4, according to such an embodiment, the deck 112 includes the powerhouse 116 in front of the electrical storage components 124. In some embodiments, the powerhouse 116 includes two diesel generator sets 154, each including an engine 156 driving an alternator 158. Rectifiers (see, e.g., rectifier 318 as shown in FIG. 7) may be used to convert alternating current provided by the diesel generator sets 154 to direct current for communication to working components of the power shovel 110 via a direct-current electrical bus (see, e.g., bus 320 as shown in FIG. 7). In other embodiments, other numbers or types of generators are used, such as a single, gasoline-powered generator set. In still other embodiments, electrical power may be supplied over cables from a standalone power plant, such as over an alternating current bus.

Figure 5:
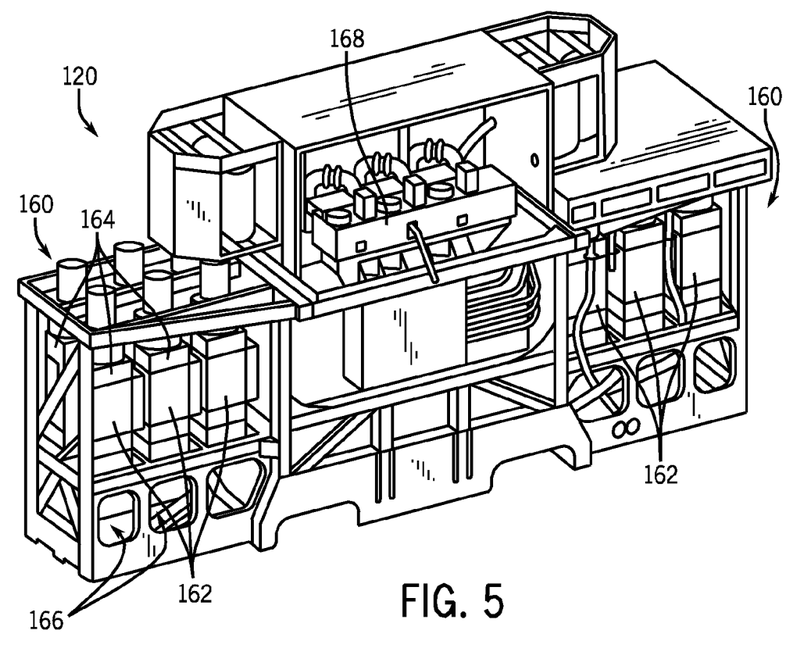
FIG. 5 is a perspective view of a hydraulic system associated with the power shovel of FIG. 1.

Referring to FIGS. 2 and 5, according to such an embodiment, the power shovel 110 includes the hydraulic system 120 for converting the electrical energy provided by the powerhouse 116 to energy of pressurized hydraulic fluid. The pressurized hydraulic fluid may then be used to drive hydraulic actuators, such as hydraulic cylinders 144, 146, 148 and hydraulic motors. In some exemplary embodiments, the hydraulic system 120 includes two groups 160 of six sets 162 of electric motors 164 coupled to hydraulic pumps 166. According to an exemplary embodiment, the pumps 166 are bi-directional, and may provide and receive hydraulic fluid under pressure in two directions.

For each set 162, the speed and direction of the hydraulic pump 166 is controlled by an electrical drive 172 (e.g., inverter) stored in the electronic compartment 118 and coupled to the bus (see also inverters 332, 334, 336 and bus 320 as shown in FIG. 7). The electrical drive 172 selectively supplies power to control the speed, direction, and/or torque of the electric motor 164, which drives the hydraulic pump 166. During operation of the power shovel 110, fewer than all of the sets 162 may be operating at one time. In other embodiments, the hydraulic system may include other numbers or arrangements of electric motors and hydraulic pumps.

Still referring to FIGS. 2 and 5, in such an embodiment the sets 162 of hydraulic pumps 166 (e.g., pump system) and electric motors 164 are coupled to a hydraulic valve manifold 168. According to an exemplary embodiment, the hydraulic valve manifold 168 is configured to direct the hydraulic fluid of one or more of the pump and motor sets 162 to and from working components of the power shovel 110. In some embodiments, the hydraulic valve manifold 168 is arranged as a matrix, where each pump and motor set 162 may be selectively coupled to each working component. By way of example, the hydraulic valve manifold 168 may couple the hydraulic fluid provided by two or more pumps to the same working component, such as one of the hydraulic cylinders 144, 146, 148. In some embodiments, the hydraulic valve manifold 168 is positioned between the two groups 160 of pump and motor sets 162.

In some embodiments the hydraulic system 120 is further configured for regeneration of energy associated with the hydraulic fluid. Surplus energy may be provided by the hydraulic fluid, such as when working components of the power shovel 110 are driven by gravity or momentum. Instead of or in combination with braking, the surplus energy of the hydraulic fluid may be conserved (e.g., reused, preserved, utilized). During such an operation, the hydraulic pumps 166 function as hydraulic motors, and are driven by the pressurized hydraulic fluid. The hydraulic pumps 166, in turn, drive the electric motors 164, which generate electricity and provide the electricity to the bus (see, e.g., bus 320 as shown in FIG. 7). If not then needed by other working components, the electricity may be stored via the energy storage components 124.

Referring again to FIG. 2, according to an exemplary embodiment the operator cab 122 includes a control computer 170 (e.g., computerized controller) that operates the electrical drives 172 positioned in the electronic compartment 118, which control the flow of electricity (e.g., amperage, voltage, frequency) from the generator sets 154 to the motor and pump sets 162 and other components, such as slew motors 174 and cooling fans 176 for the hydraulic system 120. In such embodiments, the slew motors 174 directly control rotation of the deck 112 relative to the tracks 114, such as during a swing movement of the power shovel 110.

According to an exemplary embodiment, the control computer 170 uses logic (e.g., programming, logic module) to operate the power shovel 110 in response to, in conjunction with, and/or in anticipation of various inputs, including operator commands (e.g., joystick instructions to crowd bucket, raise boom, etc.), environmental conditions (e.g., sensed terrain slope), internal conditions (e.g., hydraulic fluid temperature, available power, etc.), and other factors. In addition to responding to past and present conditions, the control computer 170 includes a logic module for operating in anticipation of future conditions (e.g., heightened loading of the power shovel 110) based upon past and present conditions, such as those that had occurred during previous operations of the power shovel 110. Operation of the power shovel 110 in a work cycle that is substantially repetitive—providing nearly identical lifting, rotating, unloading, and rotating back motions, for example—is believed to improve the accuracy with which the control computer 170 the predicts of peak loads or periods of heightened loading during the work cycle because previous iterations of the work cycle generally approximate future iterations.

Figure 6:
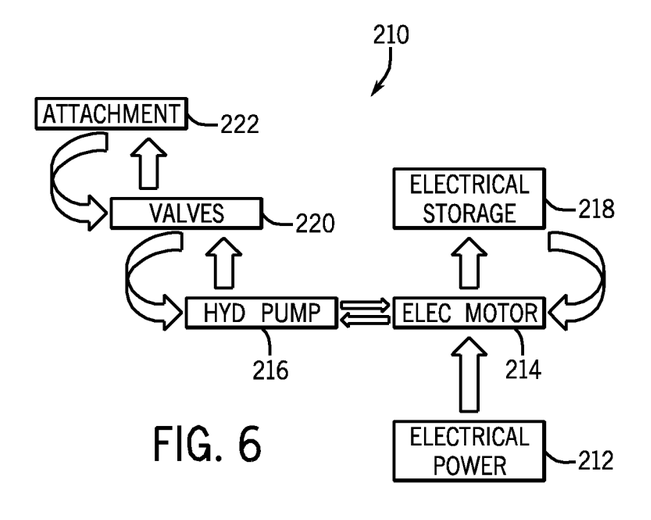
FIG. 6 is a flow chart of an energy management system according to an exemplary embodiment.

Referring now to FIG. 6, an energy management and storage system 210 includes a source 212 of electrical power, an electric motor 214, and a hydraulic pump 216. The electric motor 214 is further coupled to an electrical storage element 218. According to such an embodiment, the electric motor 214 is configured to receive power from both the electrical power source 212 and the electrical storage element 218. In addition, the electric motor 214 is configured to function as a generator and provide electricity to the electrical storage element 218.

During operation of the system 210, the electric motor 214 drives the hydraulic pump 216, which in turn pressurizes hydraulic fluid. The hydraulic fluid is controllably routed by way of valves 220 to one or more working components 222 (e.g., attachments) for operation of the working components 222. When the working components 222 are operating in a manner that uses braking resistance, the hydraulic fluid may be controllably routed through the valves 220 back to the hydraulic pump 216. In such cases, the hydraulic pump 216 may function as a hydraulic motor, driving the electric motor 214 to operate as a generator.

According to an exemplary embodiment, the source 212 of electrical power includes a generator set selected based upon output capacity. During operation of the system 210, the generator set is run at a substantially constant, optimal speed, where the speed is optimized for the particular generator set with respect to minimum fuel consumption per power output, maximum life of the generator set per power output, minimum maintenance or downtime of the system 210, or other such parameters or combinations of such parameters.

Figure 10:
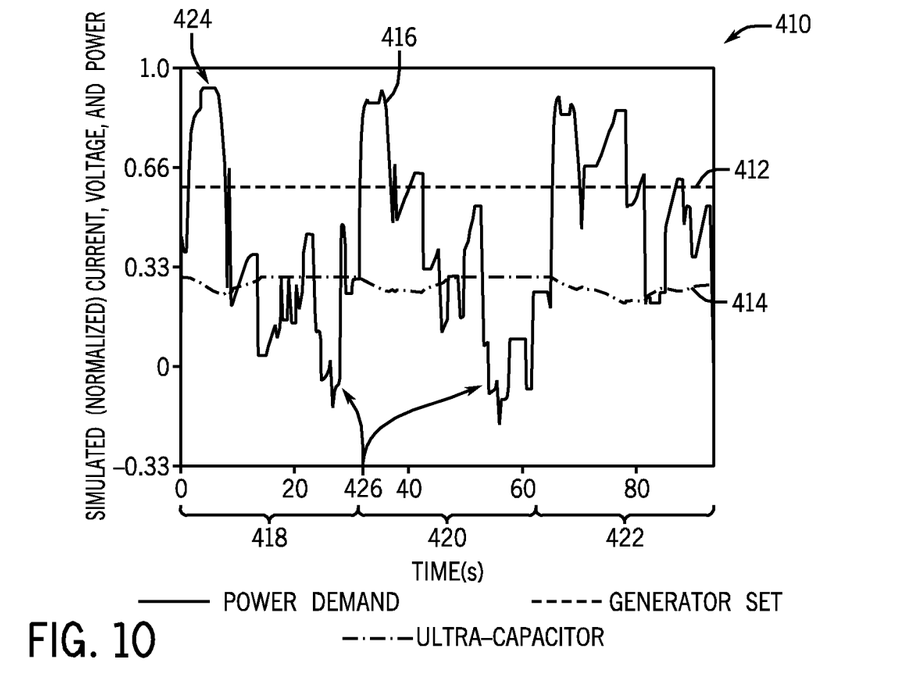
FIG. 10 is a graphical representation of prophetic data provided by a simulation according to an exemplary embodiment.

According to an exemplary embodiment, the generator set, running at the optimal speed, has an electrical output that is less than an expected power need for the system 210 during portions of a work cycle of the system 210. Additional power from the electrical storage element 218 supplements the power of the generator set, allowing the system 210 to meet momentary power demands, while the generator set to still continuously run at the optimal power output. In some embodiments, the electrical storage element provides at least 20-percent of the power used by the system during a peak demand portion of the work cycle (compare power demand 416 with generator output 412 as shown in FIG. 10). During other portions of the work cycle, the generator set may produce surplus power, which may be delivered to the electrical storage element 218.

In some embodiments, the generator set of the source 212 is selected such that running at optimal power output levels the generator set (or sets) provides the total energy used by the system 210 throughout each work cycle. The supplemental energy provided by the energy storage element 218 during the higher-demand portions of the work cycle is completely offset by the surplus energy provided by the source 212 during the lower-demand portions of the work cycle. Steady-state operation of the generator set at optimal running speeds may not occur during initial cycles of operation for a particular assignment, when the system 210 is moved to a new location, when the system 210 changes tasks, etc. During such times the generator set may be run at above or below optimal speeds.

In other embodiments, the generator set (or sets) is selected such that, at optimal running speeds of the generator set, the source 212 provides less than the total energy used by the system 210 throughout each work cycle. Instead, a portion of the energy required for each work cycle is regenerated from previous work cycles. During initial cycles, the generator set may be run above the optimal speed until the capacitor is charged and/or until energy is regenerated.

Figure 8:
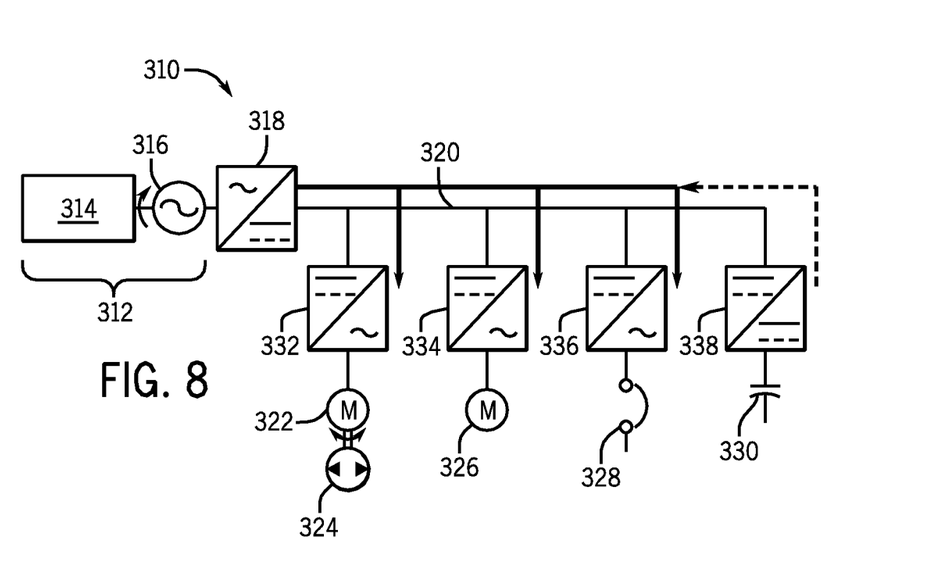
FIG. 8 is a schematic diagram of the energy management system of FIG. 7 in a second configuration.
Figure 9:
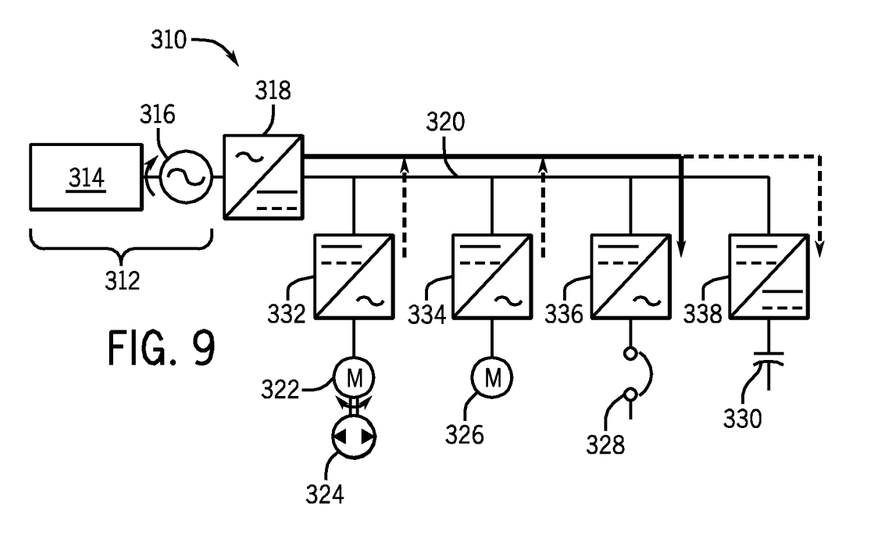
FIG. 9 is a schematic diagram of the energy management system of FIG. 8 in a third configuration.

Referring now to FIGS. 7-9, an energy management and storage system 310 includes a generator set 312 formed from an engine 314 (e.g., internal combustion engine, diesel engine) coupled to an alternator 316. When driven by the engine 314, the alternator 316 provides an electrical output that is converted from alternating current to direct current by a rectifier 318. The electrical output is then provided to a common bus 320 that is in communication with working components of the system 310.

The working components include one or more electric motors 322 coupled to one or more hydraulic pumps 324, one or more additional electric motors 326, and/or auxiliary components 328. An energy storage component 330 (e.g., one or more capacitors) is also coupled to the bus 320. In some embodiments, inverters 332, 334, 336 regulate the electricity to and from the bus 320 to each of the working components. A state-of-charge controller 338 regulates the electricity to and from the bus 320 to the energy storage component 330.

During operation of the system 310, electrical power is supplied from the generator set 312 to the bus 320, and from the bus 320 to the electric motors 322, 326 and auxiliary components 328. During lower-demand periods (e.g., portions of a work cycle) for the system 310 (see FIG. 7), some of the electricity of the bus 320 is directed to the electrical storage component 330. During higher-demand periods (e.g., other portions of the work cycle) for the system 310 (see FIG. 8), power is drawn from the electrical storage component 330 to supplement power from the generator set 312, and is provided to the electric motors 322, 326 and/or auxiliary components 328.

According to an exemplary embodiment, the generator set 312 is run at a substantially constant speed, which produces electricity at a rate below the power required by the motors 322, 326 and auxiliary components 328 during the higher-demand periods. In some such embodiments, the generator set 312 is sized and configured such that the generator set 312 would be unable to satisfy the power requirements for the higher-demand periods (e.g., expected peak loads) without support from the energy storage component 330. So sizing and configuring the generator set 312 is intended to improve the efficiency of the system 310 by reducing the weight of the system 310 (i.e., having a smaller, lighter engine and alternator) and/or optimizing the fuel consumption of the generator set 312 by running the generator set 312 at an efficient speed and reducing production of surplus electricity.

In some embodiments, the system 310 further allows for regeneration of electricity from the electric motors 322, 326 (see FIG. 9). In a contemplated application, gravity acting upon a work implement (e.g., hydraulically actuated articulated arm with bucket) associated with the system 310 provides energy, which may be communicated to the electric motors 322 by way of hydraulic fluid driving the pump 324 coupled to the motors 322. In other contemplated applications, rotational or translational momentum may be recaptured by way of motors 326 coupled to the rotating or translating portions of the system 310 (e.g., slew motors coupled to the rotatable deck of a power shovel) in place of or in conjunction with friction braking. Regeneration of electricity is intended to improve the efficiency of the system and reduce the amount of heat absorbed by the hydraulic system.

Referring now to FIG. 10, by way of a graphical representation 410 of prophetic data produced from a simulation of an energy management and storage system for heavy equipment, relationships are illustrated between energy supplied by a generator set 412, energy held by a bank of ultra-capacitors 414, and energy demand 416 of the heavy equipment. According to the simulation, three work cycles are shown 418, 420, 422, each lasting for approximately thirty seconds (i.e., about 120 per hour).

The cycles 418, 420, 422 show a substantially repetitive oscillatory demand for energy, where the peak demands 424 exceed the substantially constant rate of electricity produced by the generator set 412 (e.g., by about 50%). When the energy demand 416 exceeds the production of the generator set 412, power is drawn from the ultra-capacitors, reducing the amount of energy stored by the ultra-capacitors 414. When the energy demand 416 drops below the level of energy production by the generator set 412, some of the power produced by the generator set is supplied to the ultra-capacitors, recharging the ultra-capacitors. Also during each cycle, the energy demand 416 drops below zero 426, indicating that energy may be regenerated during a portion of the simulated cycles 418, 420, 422.

According to an exemplary embodiment, the control computer 170 includes logic for extrapolating upon data associated with prior (e.g., past) operation of the heavy equipment to predict a forthcoming need (e.g., heightened demand, peak loading). For example, from an upward trend in hydraulic power demand, the control computer 170 may use numerical methods (e.g., Taylor Series methods, Runge-Kutta methods, spline approximations) to project a future demand of the heavy equipment 110. In at least one embodiment, several preceding iterations of the work cycle are discretized and fit to curves (e.g., B-spline approximation). For example, the curves may be associated with loading of the hydraulic system 120 or of the overall heavy equipment with respect to time.

Data for prediction of the loading may come from a previous iteration of the working cycle (e.g., by a similar piece of heavy equipment, operating elsewhere and on an early day), an immediately preceding operation of the heavy equipment (e.g., preceding step in the work cycle), several preceding work cycles of the heavy equipment, or other sources. The fidelity of the curve fitting (e.g., size(s) of time step), may vary as a function of the processing speed of the control computer 170, the efficiency of the logic module, and the variability of the substantially repetitive work cycle (e.g., a wider time step may be sufficiently useful for a more variable work cycle, where the level of predictability between cycles is not extremely precise).

According to an exemplary embodiment, the control computer 170 is directly or indirectly coupled to the energy storage components 124, and connects the energy storage components 124 to the bus 320, to supplement the power of the bus 320 (e.g., supplied by the generator set) immediately before (e.g., on the order of milliseconds before) a period of higher demand that would otherwise cause a significant and/or excessive voltage decrease. In other embodiments, the control computer checks to verify that the energy storage components 124 are online with the bus 320, prior to a predicted future demand. Predictive coupling of the energy storage components 124 and the bus 320 is intended to keep the bus 320 at a substantially constant voltage (e.g., within ten percent of a nominal voltage), allowing the bus 320 to provide nominal electrical power as peak or increased loads are applied on the heavy equipment 110. In some such embodiments, the control computer 170 couples the energy storage components 124 and the bus 320 about fifty milliseconds (e.g., at least 10 milliseconds) before an anticipated demand increase during the substantially repetitive cycle.

Although shown with ultra-capacitors in FIG. 10, in other contemplated embodiments, an energy-storage system recaptures energy in one or more hydraulic accumulators, which would then be available as needed to supplement the generator set during peak demand periods. In other contemplated embodiments, a mechanical energy-storage system stores energy in rotating devices of rotational inertia, such as flywheels, or in potential energy of elevated weights. The stored energy would then be released as needed to supplement the main mechanical drives during periods of peak demand.

In other contemplated embodiments, various forms of both stationary and mobile heavy equipment include an energy management and storage system, as described above. The degree of repetitiveness of a work cycle for the heavy equipment may vary as a function of the particular form of heavy equipment and the particular operation or mission to be performed. In some embodiments (e.g., hydraulic drill), a cycle is repeated at a faster or slower rate than the example shown in FIG. 10. In some embodiments, the work cycle or pattern includes more than one peak or period in which energy from an energy storage component supplements an associated generator set.

In some contemplated embodiments the power shovel 110 includes a system for predicting the occurrence of a need for increased pressure in the hydraulic system, and increases the speed or number of hydraulic pumps 166 in advance of a predicted heightened demand to charge an accumulator. In such embodiments, the accumulator of the hydraulic circuit is generally analogous to the ultra-capacitor of the electrical bus. The pressurized fluid from the charged accumulator may be used during the period of heighted demand that was predicted. Forward-looking operation of the hydraulic system 120 is intended to save time during the work cycle of the power shovel 110 by reducing or preventing delay associated with increasing the hydraulic pressure.

One contemplated embodiment relates heavy equipment that is designed to operate in a substantially repetitive work cycle that includes lifting, rotating, and lowering steps. The heavy equipment includes a body mounted on tracks and hydraulic cylinders for operating an articulated arm and a bucket. A pump system, including at least one hydraulic pump and an accumulator, provides hydraulic fluid to the hydraulic cylinders. A generator set provides an electrical output that powers the pump system. The hydraulic cylinders more specifically include at least a first hydraulic cylinder and a second hydraulic cylinder. The articulated arm extends from the body, and is maneuverable relative to the body by way of the first hydraulic cylinder. The bucket extends from to the articulated arm, and is maneuverable relative to the articulated arm by way of the second hydraulic cylinder. A computerized controller coupled to the pump system includes a logic module for operating the pump system to charge the accumulator, in advance of a predicted demand for operation of the hydraulic cylinders. The predicted demand is anticipated by the computerized controller as forthcoming based upon extrapolation, at least in part, from data related to a previous operation of the heavy equipment.

Another contemplated embodiment relates to heavy equipment that is designed to operate in a substantially repetitive cycle, and includes a work implement, a pump, an accumulator, a generator set, a linear actuator, and a computerized controller. The pump is at least one of a hydraulic pump and a pneumatic pump. The generator set is configured to provide electrical energy as output for directly or indirectly powering the pump. The linear actuator operates the work implement and is powered by fluid pressurized by the pump. The computerized controller directly or indirectly controls the pump, where the computerized controller includes a logic module for operating the pump to charge the accumulator in advance of a predicted heightened loading of the work implement requiring an increased supply of pressurized fluid from the pump. The predicted heightened loading of the work implement is anticipated by the computerized controller as forthcoming based upon extrapolation, at least in part, from data related to a past operation the work implement.

The construction and arrangements of the energy management system for heavy equipment, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. Heavy equipment designed to operate in a substantially repetitive cycle, comprising:
    a work implement;
    an actuator for operating the work implement;
    an electrical bus;
    a power source connected to the electrical bus for powering the actuator;
    a capacitor configured to be connected to the electrical bus for receiving power from the power source during a portion of the substantially repetitive cycle and for augmenting the power source during another portion of the substantially repetitive cycle;
    a computerized controller comprising a logic module for connecting the capacitor to the electrical bus in advance of a predicted demand on the electrical bus to maintain a substantially constant voltage on the electrical bus during the predicted demand and prevent a drop in voltage on the electrical bus that would otherwise result from the predicted demand, wherein the predicted demand is anticipated by the computerized controller as forthcoming based upon extrapolation, at least in part, from data related to a past operation of the heavy equipment.

2. The heavy equipment of claim 1, wherein the data used by the computerized controller for anticipation of the predicted demand comprises data corresponding to a previous iteration of the substantially repetitive cycle.

3. The heavy equipment of claim 1, wherein the data used by the computerized controller for anticipation of the predicted demand comprises data corresponding to an immediately preceding operation of the heavy equipment.

4. The heavy equipment of claim 3, wherein the data used by the computerized controller for anticipation of the predicted demand comprises data corresponding to immediately preceding iterations of the substantially repetitive cycle by the heavy equipment.

5. The heavy equipment of claim 1, wherein the power source comprises a generator set.

6. The heavy equipment of claim 1, wherein the capacitor receives power from the power source to charge the capacitor when demand on the electrical bus is less than an electrical output of the power source.

7. The heavy equipment of claim 6, wherein the computerized controller is configured to decouple the capacitor from the electrical bus when the capacitor is fully charged.

8. The heavy equipment of claim 1, wherein the capacitor comprises an ultra-capacitor.

9. The heavy equipment of claim 1, wherein the actuator comprises a linear actuator.

10. The heavy equipment of claim 1, wherein the power source provides power to the electrical bus at a substantially constant rate regardless of a present loading of the work implement.

11. The heavy equipment of claim 6, wherein the power source is operated such that the substantially constant rate of power provided by the power source is insufficient to provide power for the predicted demand during the substantially repetitive cycle.

* * * * *